United States Patent Office 3,840,619
Patented Oct. 8, 1974

3,840,619
POLYMERIC COMPOSITIONS
Elihu J. Aronoff, Framingham, and Kewal S. Dhami, Shrewsbury, Mass., assignors to International Telephone and Telegraph Corporation, New York, N.Y.
No Drawing. Filed July 28, 1972, Ser. No. 276,055
Int. Cl. C08f *15/00*
U.S. Cl. 260—878 R  8 Claims

ABSTRACT OF THE DISCLOSURE

Crosslinked polymeric compositions are provided comprising high temperature processing fluorocarbon polymers and triallyl esters of aryl polycarboxylic acids. The crosslinked compositions are particularly useful for insulation coatings.

---

This invention relates to irradiation crosslinked polymeric compositions and to methods for producing these compositions. More particularly, it relates to irradiation crosslinked high temperature processing fluorocarbon polymeric compositions having incorporated therein a crosslinking coreactant compound.

It has been a continuing problem to provide means for crosslinking high temperature processing fluorocarbon polymers, both homopolymers and copolymers, such as ethylene-tetrafluoroethylene copolymers, ethylene-chlorotrifluoroethylene copolymers, polyvinylidene fluoride homopolymers, tetrafluoroethylene-vinylidene fluoride copolymers, tetrafluoroethylene-hexafluoropropylene copolymers, vinylidene fluoride-hexafluoropropylene copolymers, vinylidene fluoride-hexafluoropropylene-tetrafluoroethylene copolymers and the like. This problem has been particularly evident when attempts have been made to process these fluorocarbon polymers for use as extruded, crosslinked insulating coatings, for example, on wires.

For example, it has been found that it is not feasible to crosslink extruded fluorocarbon polymers such as ethylene-tetrafluoroethylene or ethylene-chlorotrifluoroethylene copolymers employing known chemical crosslinking agents and techniques since the chemical crosslinking systems prereact during the high temperature processing required for extrusion of these polymers. As a result of this prereaction, these agents are not available to provide crosslinking of the extruded products and, thus, effective crosslinking cannot be achieved. As an alternative to chemical crosslinking, irradiation crosslinking of these polymers has been studied. However, it was found that although some crosslinking of these polymers can be achieved by subjecting them to relatively massive doses of irradiation, the resulting crosslinked products are not commercially acceptable on the basis of cost and overall products properties. Accordingly, it would be highly desirable and commercially important to provide suitable crosslinking coreactants for use with fluorocarbon polymers which would enable crosslinking of these polymers with moderate doses of irradiation subsequent to high temperature processing as encountered in extrusion and certain molding techniques.

It is, therefore, an object of the present invention to provide an effective and commercially acceptable crosslinking coreactant for incorporation with high temperature processing fluorocarbon polymers. In this regard, it is a principal object of this invention to provide crosslinking coreactants for use in conjunction with ethylene-tetrafluoroethylene and ethylene-chlorotrifluoroethylene copolymers to enable high temperature processing of the polymeric compositions and subsequent irradiation crosslinking thereof.

Another object is to provide irradiation crosslinked compositions containing a high temperature processing fluorocarbon polymer which retain their chemical and flame resistance and excellent mechanical properties without substantial degradation.

A further object is to provide extruded polymeric compositions comprising a high temperature processing fluorocarbon polymer, such as an ethylene-tetrafluoroethylene or an ethylene-chlorotrifluoroethylene copolymer, and a crosslinking coreactant, which compositions can be crosslinked by subjecting the extruded compositions to moderate doses of irradiation.

A still further object is to provide a method for high temperature processing as by extrusion of a composition comprising a fluorocarbon polymer, such as an ethylene-tetrafluoroethylene or an ethylene-chlorotrifluoroethylene copolymer, and a crosslinking coreactant and subsequently irradiating the composition with a moderate dose of high energy ionizing radiation to produce a high strength, chemical and flame resistant crosslinked polymeric composition without substantial degradation thereof.

Yet another object is to provide insulation coatings comprising an extruded, irradiation crosslinked high temperature processing fluorocarbon polymer and a crosslinking coreactant.

Other objects, if not specifically set forth herein, will be readily apparent to those skilled in the art from the following detailed description of the invention.

Generally, we have discovered that by incorporating a triallyl ester of an aryl polycarboxylic acid with a high temperature processing fluorocarbon polymer, the resulting composition can be irradiation crosslinked with a moderate dose of radiation to produce a product having excellent mechanical properties and deformation resistance at both ambient and elevated temperatures. This polymeric composition including the triallyl ester coreactant has been found to crosslink very effectively even after the composition has been subjected to the high temperature processing conditions which are required for extruding or, in certain instances, for molding the fluorocarbon polymers (i.e., temperatures in excess of about 500° F. and even above 700° F. in some cases).

In a preferred embodiment of our invention, a composition is formed comprising either an ethylene-tetrafluoroethylene or an ethylene-chlorotrifluoroethylene copolymers and a crosslinking coreactant comprising a triallyl derivative of either trimellitic or trimesic acid. The amount of crosslinking coreactant to be incorporated in the composition can vary depending on factors such as the processing conditions to be employed, the degree of crosslinking desired, the particular application of the crosslinked end product and like factors. However, we have found that it is preferred to employ the crosslinking coreactant in an amount of about 1–10% (by weight) and most preferably about 3–6% (by weight). Irradiation crosslinking of the composition is readily accomplished by subjecting the composition to a moderate dose of irradiation (e.g., about 3–15 megarads) with high energy ionizing radiation employing standard techniques.

We have found, for example, that irradiation crosslinked compositions comprising an ethylene-chlorotrifluoroethylene copolymer and a trially trimesate or a triallyl trimellitate crosslinking coreactant possess excellent overall elevated temperature mechanical properties such as tensile, elongation, creep and the like. Additionally, it has been noted that when ethylene-tetrafluoroethylene copolymers are subjected to irradiation in the absence of these crosslinking coreactants, some crosslinking occurs but the copolymer undergoes scission (i.e., degradation); ambient temperature tensiles and elongations both decrease indicative of the predominance of degradation effects; and overall mechanical, electrical and aging characteristics decline. However, when a crosslinking coreactant of the present invention is incorporated with the ethylene-tetrafluoroethylene copolymer, the resulting irradiated, crosslinked composition possesses excellent ambient temperature tensiles and elongation and the mechanical, electrical and aging characteristics are not adversely affected and substantially no degradation is exhibited.

When a composition of the present invention is employed as an insulation coating, as for example, on wire, the composition is extruded by conventional techniques directly onto the surface of the wire, preferably as a relatively thin wall coating. Thereafter, the extruded composition, while on the surface of the wire, is subjected to a dose of radiation sufficient to provide the desired degree of crosslinking without subtsantially degrading the material. It has been determined that a radiation dose in the range of about 3–15 megarads, and preferably about 5–10 megarads, is suitable to provide the desired degree of crosslinking.

Exemplary of the triallyl esters of aryl polycarboxylic acids which are employed as the crosslinking coreactants in the compositions of the present invention are triallyl trimesate and triallyl trimellitate. These crosslinking coreactants are thermally stable in terms of reactivity and are essentially non-volatile at processing temperatures above about 500° F. Both triallyl trimesate and triallyl trimellitate are known compounds and procedures for preparation thereof from trimesic acid and from trimellitic anhydride, respectively, have been reported in the literature, for example, Chemical Abstracts *54*, 24367a and Chemical Abstracts *63*, 2920d.

The blended mixtures were then compression molded at 510–520° F. and subjected to irradiation at 10 megarad doses under a 1.5 m.e.v. electron beam accelerator to produce crosslinked polymeric compositions having the following mechanical properties at elevated temperature (250° C.):

Composition A
   Tensile Strength _____ p.s.i__ 523
   Elongation (at 10"/minute stretch) __percent__ 233
   Hot Modulus* _____ do____ 25
Composition B
   Tensile Strength _____ p.s.i__ 485
   Elongation (at 10"/minute stretch) __percent__ 223
   Hot Modulus* _____ do____ 36

*The hot modulus test indicates the percentage extension of a sample strip of crosslinked polymer after heating the polymeric composition above the melting temperature of the uncrosslinked polymeric composition, and applying a 50 p.s.i. stress to the crosslinked composition while it is above this melting temperature and subsequently cooling of the composition to room temperature.

EXAMPLE II

Samples of the irradiation crosslinked compositions of Example I (i.e. Composition A and Composition B) were aged at 200° C. and tested for tensile strength and elongation after cooling to room temperature (about 25° C.). The results of this testing demonstrating the superior aging qualities possessed by polymeric compositions containing a triallyl trimesate or a triallyl trimellitate crosslinking coreacting were as follows:

TABLE I

| Composition: | Irradiation dosage (megarads) | Test | Aging period | | | | | | |
|---|---|---|---|---|---|---|---|---|---|
| | | | 0 days | 1 day | 3 days | 5 days | 7 days | 15 days | 21 days |
| A | 10 | Tensile strength (p.s.i.) | 6,719 | 5,967 | 5,908 | 5,960 | 5,968 | 5,659 | 5,368 |
| | | Retention T.S. (percent) | | | | | 89 | 84 | 80 |
| B | 10 | Tensile strength (p.s.i.) | 6,273 | 5,513 | 5,501 | 5,435 | 5,368 | 5,031 | 4,916 |
| | | Retention T.S. (percent) | | | | | 86 | 80 | 78 |
| A | 10 | Elongation at 10 inches per minute stretch (percent) | 200 | 188 | 158 | 150 | 194 | 158 | 175 |
| | | Retention elongation (percent) | | | | | 97 | 79 | 88 |
| B | 10 | Elongation at 10 inches per minute stretch (percent) | 194 | 158 | 188 | 188 | 183 | 154 | 150 |
| | | Retention elongation (percent) | | | | | 94 | 79 | 77 |

The following Examples are set forth only for purposes of further illustrating the invention and are not intended to be construed as being limitative in any respect.

EXAMPLE I

This example and the following example illustrate the excellent mechanical and aging properties possessed by crosslinked ethylene-tetrafluoroethylene compositions of the present invention.

A polymeric composition (hereinafter termed Composition A) was prepared by powder blending an ethylene-tetrafluoroethylene copolymer with 3% (by weight) triallyl trimesate. A second polymeric composition (hereinafter termed Composition B) was also prepared by powder blending the ethylene-tetrafluoroethylene copolymer with 3% (by weight) triallyl trimellitic. Magnesium oxide in an amount of 1% (by weight) was blended into both polymeric compositions.

EXAMPLE III

This example and the following example illustrate the excellent mechanical and aging properties possessed by crosslinked ethylene-chlorotrifluoroethylene compositions of the present invention.

A polymeric composition (hereinafter termed Composition C) was prepared by powder blending an ethylene-chlorotrifluoroethylene copolymer with 6% (by weight) triallyl trimesate. A second polymeric composition (hereinafter termed Composition D) was also prepared by powder blending the ethylene-chlorotrifluoroethylene copolymer with 6% (by weight) triallyl trimellitate. Magnesium oxide in an amount of 1% (by weight) was blended into both polymeric compositions.

The blended mixtures were then compression molded at 490° F. and subjected to irradiation at 10 megarad doses in a 1.5 m.e.v. electron beam accelerator to produce crosslinked polymeric compositions having the following mechanical properties at elevated temperature (250° C.):

Composition A
- Tensile Strength _____p.s.i__ 180
- Elongation (at 10"/minute stretch) __percent__ 59
- Hot Modulus* _____do____ 11

Composition B
- Tensile Strength _____p.s.i__ 166
- Elongation (at 10"/minute stretch) __percent__ 177
- Hot Modulus* _____do____ 30

*For description of Hot Modulus Test see Example I.

EXAMPLE IV

Samples of the irradiation crosslinked compositions of Example III (i.e. Composition C and Composition D) were aged at 200° C. and tested for tensile strength and elongation after cooling to room temperature (about 25° C.). The results of this testing demonstrating the superior aging qualities possessed by polymeric compositions containing a triallyl trimesate or a triallyl trimellitate crosslinking coreactant were as follows:

TABLE II

| Composition: | Irradiation dosage (megarads) | Test | Aging period | | | |
|---|---|---|---|---|---|---|
| | | | 0 day | 1 day | 3 days | 5 days |
| C_____ | 0 | Tensile strength (p.s.i.)_____ | 7,617 | 6,263 | 6,543 | 6,167 / [1] 6,180 |
| | 10 | _____do_____ | 7,241 | 6,662 | 6,281 | 5,712 / [1] 5,494 |
| D_____ | 10 | _____do_____ | 6,853 | 6,811 | 6,409 | 6,096 / [2] 6,278 |
| C_____ | 0 | Elongation (percent at 10 inches per minute stretch). | 250 | 294 | 331 | 300 / [1] 338 |
| C_____ | 10 | _____do_____ | 108 | 92 | 82 | 71 / [1] 71 |
| D_____ | 10 | _____do_____ | 117 | 125 | 119 | 106 / [2] 106 |

[1] 8 days.
[2] 7 days.

EXAMPLE V

A polymeric composition was prepared by powder blending an ethylene-tetrafluoroethylene copolymer with 6% (by weight) triallyl trimellitate and 1% by weight magnesium oxide. The blended mixture was divided into three samples which were compression molded at 510–520° F. One sample was not irradiated and the other two samples were subjected to irradiation at 5 and 10 megarad doses, respectively, under a 1.5 m.e.v. electron beam accelerator to effect crosslinking. The three samples were then tested to determine the mechanical properties at elevated temperature (250° C.). The results were as follows:

TABLE III

| Dose (megarads) | Tensile strength (p.s.i.) | Elongation (percent at 10"/minute stretch) | Hot modulus (percent at 250° C., 50 p.s.i.) |
|---|---|---|---|
| 0_____ | 110 | 11 | Melted |
| 5_____ | 296 | 183 | 105 |
| 10_____ | 510 | 120 | 18 |

Additionally, the three samples were tested for aging characteristics by the procedure of Example II. The results of this testing were as follows:

Thermal stability of the polymeric composition prepared in this example which was subjected to a 10 megarad dose of irradiation crosslinking was also tested in linear temperature programmed thermogravimetric analysis with the following results:

| Temperature (10° C. rise per minute), ° C. | Percent weight loss |
|---|---|
| 400 | 0.7 |
| 450 | 4.2 |
| 500 | 10.0 |

EXAMPLE VI

This example shows the effectiveness of crosslinked polymeric compositions of the present invention for use as insulation coatings for wires.

A sample comprising pure ethylene-tetrafluoroethylene copolymer and another sample comprising ethylene-tetrafluoroethylene copolymer and 3.0% (by weight) triallyl trimellitate were prepared by a powder blending process similar to that shown in Example I. The resulting samples in powdered form, were then extruded through an extruder having a head temperature of 530° F. to form rods. The rods were then pelletized and the pellets were extruded onto the surface of a 20 gauge tin coated copper wire. The extrusion conditions for the wire insulation were as follows:

| Crosslinking coreactant incorporated with ethylenetetrafluoroethylene copolymer | Weight (percent) | Temperature (° F.) | | | | |
|---|---|---|---|---|---|---|
| | | Barrel zones | | | Die | Head |
| | | 1 | 2 | 3 | | |
| None_____ | | 580 | 600 | 600 | 670 | 710 |
| Triallyl trimellitate_____ | 3.0 | 590 | 590 | 590 | 650 | 700 |

The two insulated wires were then subjected to irradiation with high energy electrons by a 1.0 m.e.v. resonant beam transformer. The resulting insulated wires with irradiation crosslinked coatings were the annealed and subsequently tested to determine their mechanical and elec-

TABLE IV

| Irradiation dosage (megarads) | Test | Aging period | | | | | | |
|---|---|---|---|---|---|---|---|---|
| | | 0 day | 1 day | 3 days | 5 days | 7 days | 15 days | 20 days |
| 0_____ | Tensile strength (p.s.i.)_____ | 5,982 | 5,084 | 4,549 | 5,063 | 5,178 | 4,621 | 4,279 |
| 5_____ | _____do_____ | 5,813 | 5,150 | 4,849 | 4,905 | 4,820 | 4,288 | 4,453 |
| 10_____ | _____do_____ | 6,093 | 6,270 | 6,016 | 5,715 | 5,470 | 5,299 | 4,931 |
| 0_____ | Elongation (percent at 10 inches per minute stretch). | 367 | 375 | 375 | 388 | 394 | 400 | 425 |
| 5_____ | _____do_____ | 292 | 194 | 125 | 144 | 144 | 106 | 100 |
| 10_____ | _____do_____ | 133 | 106 | 106 | 119 | 113 | 100 | 94 | trical properties. The results of this testing are set forth in the following table:

TABLE V

| Tests | Ethylenetetrafluoroethylene with 3.0% (by weight) triallyl trimellitate | | Ethylenetetrafluoroethylene (no additives) | |
|---|---|---|---|---|
| | 10 megarad dose | 15 megarad dose | 10 megarad dose | 15 megarad dose |
| Insulating weight (lbs./1,000 ft.) | 3.0 | 3.0 | 3.0 | 3.0 |
| Tensile strength (p.s.i., room temp.) | 7,736 | 7,717 | 5,229 | 5,562 |
| Elongation (room temp.) (at 10″/minute stretch) | 100 | 100 | 133 | 200 |
| Solder iron (seconds) | 300+ | 300+ | 26.6 | 300+ |
| Tensile strength (p.s.i. of 275° C.) | 118 | 102 | 27 | 50 |
| Elongation (at 275° C.) | 99 | 76 | 375 | 30+ |
| Hot modulus (275° C., 50 p.s.i.) | 35.3 | 30 | Failed | 295 |

EXAMPLE VII

A sample composition was prepared by compounding an ethylene - tetrafluoroethylene copolymer with triallyl trimellitate in a ratio of 90/10 parts by weight. The resulting sample was extruded through an extruder having a head temperature of 500° F. to form a rod. The rod was then pelletized.

Sample pellets were collected and subjected to extraction with tetrahydrofuran for 65 hours followed by extraction with chloroform for an additional 60 hours. Then, by infrared examination of the extracts, it was determined that 78% of the original weight of triallyl mellitate was present in the extruded rod.

Following this extrusion, it was determined that .96 parts by weight of triallyl mellitate was extractable from the extruded coating as compared with an initial concentration of 1.3 parts by weight of triallyl mellitate prior to the extrusion coating. Thus, about 74% of the original triallyl mellitate content remained as unvolatilized, uncombined, extractable monomer in the extruded product.

The coated wire was then subjected to irradiation with high energy electrons by a 1.0 m.e.v. resonant beam transformer. The resulting insulated wire with irradiation crosslinked coating was then tested to determine its mechanical and electrical properties. The results of this testing are set forth in the following table:

TABLE VI

| Test | 0 megarad | Irradiation dose | | | | | |
|---|---|---|---|---|---|---|---|
| | | 5 megarads | | 10 megarads | | 20 megarads | |
| | | Unannealed | Annealed | Unannealed | Annealed | Unannealed | Annealed |
| Tensile strength: | | | | | | | |
| Room temp., 2″/minute | 6,021 | 6,392 | 6,100 | 6,419 | 5,888 | 5,517 | 6,021 |
| Room temp., 20″/minute | 5,782 | 5,941 | 5,994 | 5,676 | 5,676 | 5,623 | 5,835 |
| Elongation: | | | | | | | |
| Room temp., 2″/minute | 216 | 241 | 250 | 233 | 200 | 175 | 175 |
| Room temp., 20″/minute | 250 | 233 | 258 | 208 | 183 | 183 | 175 |
| Tensile strength (275° C., 10″/minute) | 43 | 43 | 43 | 52 | 71 | 47 | 50 |
| Elongation (275° C., 10″/minute) | | 477 | 313 | 243 | 190 | 52 | 40 |
| Hot modulus (percent 275° C., 50 p.s.i.) | | 477+ | 313+ | 237 | 121 | 52+ | 40 |
| After 7 days at 200° C.: | | | | | | | |
| Tensile strength: | | | | | | | |
| Room temp., 2″/minute | 5,549 | 5,570 | | 5,464 | | 5,517 | |
| Room temp., 20″/minute | 5,416 | 5,464 | | 5,331 | | 5,464 | |
| Elongation: | | | | | | | |
| Room temp., 2″/minute | 258 | 250 | | 216 | | 66 | |
| Room temp., 20″/minute | 258 | 258 | | 225 | | 150 | |
| Tensile strength (275° C., 10″/minute) | | 57 | | 57 | | 71 | |
| Elongation (275° C., 10″/minute) | | 337 | | 163 | | 66 | |
| After 7 days at 225° C.: | | | | | | | |
| Tensile strength: | | | | | | | |
| Room temp., 2″/minute | 4,815 | 4,965 | | 5,164 | | 5,270 | |
| Room temp., 20″/minute | 4,657 | 4,657 | | 5,031 | | 5,358 | |
| Elongation: | | | | | | | |
| Room temp., 2″/minute | 225 | 158 | | 150 | | 100 | |
| Room temp., 20″/minute | 175 | 208 | | 116 | | 100 | |
| Insulation resistance (megohms/1,000 ft.) | | 500,000+ | | 500,000+ | | 500,000+ | |
| Flammability | | (1) | | (1) | | (1) | |
| Life cycle: | | | | | | | |
| 200° C.—7 days | | (2) | | (2) | | (2) | |
| 225° C.—7 days | | (2) | | (2) | | (2) | |
| 250° C.—7 days | | (2) | | (2) | | (2) | |
| Accelerated aging: | | | | | | | |
| 225° C.—7 hours | | (2) | | (2) | | (2) | |
| 250° C.—7 hours | | (2) | | (2) | | (2) | |

1 No burning, no flaming tissue.
2 No cracks, no dielectric failure.

The remaining pellets from the rod were blended with an additional amount of ethylene-tetrafluoroethylene copolymer on a 1 to 5 parts by weight basis and this blend was extruded onto the surface of a wire. The extrusion conditions for the wire coating were as follows:

| Barrel zones | Temperature (° F.) |
|---|---|
| 1 | 580 |
| 2 | 580 |
| 3 | 580 |
| Diehead | { 630 / 680 |

Obviously, many modifications and variations of the invention as hereinbefore set forth may be made without departing from the spirit and scope thereof, therefore, only such limitations should be imposed as are indicated in the appended claims.

We claim:

1. A polymeric composition comprising a fluorocarbon polymer and a triallyl ester of an aryl polycarboxylic acid.

2. The polymeric composition of claim 1 wherein said triallyl ester of an aryl polycarboxylic acid is selected from the group consinting of triallyl trimesate, triallyl trimellitate and mixtures thereof.

3. The polymeric composition of claim 2 wherein said fluorocarbon polymer is selected from the group consisting of ethylene-tetrafluoroethylene copolymers, ethylene-chlorotrifluoroethylene copolymers, polyvinylidene fluoride homopolymers, tetrafluoroethylene-vinylidene fluoride copolymers, tetrafluoroethylene-hexafluoropropylene copolymers, vinylidene fluoride-hexafluoropropylene copolymers, vinylidene-fluoridehexafluoropropylene - tetrafluoroethylene copolymers and mixtures thereof.

4. The composition of claim 1 wherein the amount of triallyl ester in said composition is about 1–10% (by weight).

5. A polymeric composition comprising a fluorocarbon polymer and a triallyl ester of an aryl polycarboxylic acid, said fluorocarbon polymer being selected from the group consisting of homopolymers and copolymers of tetrafluoroethylene, chlorotrifluoroethylene, vinylidene fluoride and hexafluoropropylene monomers and mixtures thereof.

6. The polymeric composition of claim 5 wherein said fluorocarbon polymer is a copolymer of said monomer with a comonomer selected from the group consisting of ethylene, tetrafluoroethylene, chlorotrifluoroethylene, vinylidene fluoride, hexafluoropropylene and mixtures thereof.

7. The polymeric composition of claim 5 wherein said triallyl ester of an aryl polycarboxylic acid is selected from the group consisting of triallyl trimesate, triallyl trimellitate and mixtures thereof.

8. The polymeric composition of claim 7 wherein the amount of said triallyl ester in said composition is about 1–10% (by weight).

References Cited

UNITED STATES PATENTS

| | | | |
|---|---|---|---|
| 3,607,827 | 9/7971 | Dukert et al. | 260—884 |
| 3,580,829 | 5/1971 | Lanza | 260—884 |
| 3,718,558 | 2/1973 | Tabata et al. | 260—87.5 B |
| 3,467,635 | 9/1969 | Brasen et al. | 260—87.5 B |
| 2,965,619 | 12/1960 | Honn et al. | 260—87.5 A |
| 3,539,488 | 11/1970 | Klopfer et al. | 260—878 R |

FOREIGN PATENTS

| | | | |
|---|---|---|---|
| 853,640 | 11/1960 | Great Britain | 260—878 |

JOSEPH L. SCHOFER, Primary Examiner

A. HOLLER, Assistant Examiner

U.S. Cl. X.R.

204—159.17; 260—87.5 A, 87.5 B, 92.1, 884